United States Patent
Leineweber et al.

(10) Patent No.: US 8,515,644 B2
(45) Date of Patent: Aug. 20, 2013

(54) METHOD AND DEVICE FOR CONTROLLING THE SPEED OF A MOTOR VEHICLE

(75) Inventors: Thilo Leineweber, Stuttgart (DE); Axel Stamm, Stuttgart (DE); Stephan Dorenkamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 2503 days.

(21) Appl. No.: 10/797,680

(22) Filed: Mar. 9, 2004

(65) Prior Publication Data

US 2004/0254712 A1 Dec. 16, 2004

(30) Foreign Application Priority Data

Mar. 10, 2003 (DE) .................. 103 10 720

(51) Int. Cl.
- *B60T 7/12* (2006.01)
- *G05D 1/00* (2006.01)
- *G06F 7/00* (2006.01)
- *G06F 17/00* (2006.01)

(52) U.S. Cl.
USPC ........................................ 701/96

(58) Field of Classification Search
USPC ................................... 701/96, 93
See application file for complete search history.

(56) References Cited

U.S. PATENT DOCUMENTS

| | | | |
|---|---|---|---|
| 4,853,720 A | 8/1989 | Omari et al. | |
| 5,594,645 A | 1/1997 | Nishimura et al. | |
| 6,081,763 A * | 6/2000 | Smith et al. | 701/93 |
| 6,273,204 B1 * | 8/2001 | Winner et al. | 180/170 |
| 6,311,120 B1 * | 10/2001 | Asada | 701/96 |
| 6,434,471 B1 * | 8/2002 | Asada et al. | 701/96 |
| 6,941,215 B2 * | 9/2005 | Hellmann et al. | 701/93 |

FOREIGN PATENT DOCUMENTS

| | | |
|---|---|---|
| DE | 10029842 | 12/2001 |
| EP | 1063626 | 12/2000 |
| EP | 1209649 | 5/2002 |

OTHER PUBLICATIONS

"Adaptive Cruise Control System Aspects and Development Trends" by Winner, Witte, Uhler and Lichtenberg, published at the SAE International Congress & Exposition, Detroit, Feb. 26-29, 1996.

* cited by examiner

*Primary Examiner* — Khoi Tran
*Assistant Examiner* — Nicholas Kiswanto
(74) *Attorney, Agent, or Firm* — Kenyon & Kenyon LLP

(57) ABSTRACT

A method and a device for controlling the speed of a motor vehicle in terms of a constant distance control in the case that at least one preceding vehicle was detected by a radar sensor or in terms of constant speed control in the case that no preceding vehicle was detected by a radar sensor, the distance to the preceding vehicle being able to be set by the driver in the form of a time gap, wherein the longitudinal dynamics of the speed control may be changed when the time gap changes.

3 Claims, 1 Drawing Sheet

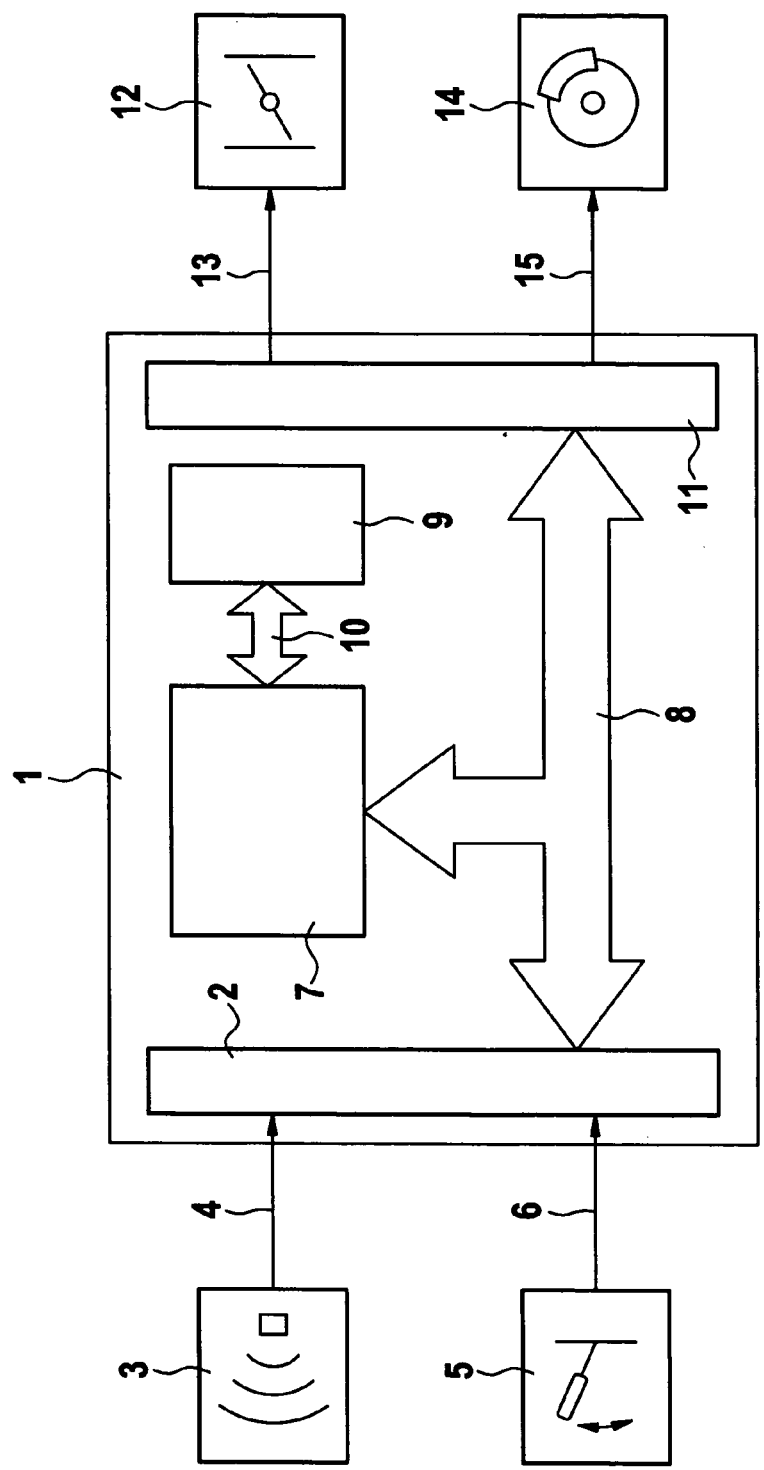

METHOD AND DEVICE FOR CONTROLLING THE SPEED OF A MOTOR VEHICLE

FIELD OF THE INVENTION

The present invention relates to a method and a device for controlling the speed of a motor vehicle, in which the speed functions in terms of a constant distance control in the case that at least one preceding vehicle is detected by a radar sensor, or the speed control functions in terms of a constant speed control in the case that no preceding vehicle is detected by a radar sensor, the distance to the preceding vehicle being able to be set by the driver in the form of a time gap. According to the present invention, a change in the time gap by the driver causes the longitudinal dynamics of the speed control to change.

BACKGROUND INFORMATION

An adaptive speed control that emits a radar beam and detects a preceding vehicle based on the reflected and received partial waves is known from the publication "Adaptive Cruise Control System Aspects and Development Trends" by Winner, Witte, Uhler and Lichtenberg, published at the SAE International Congress & Exposition, Detroit, Feb. 26-29, 1996. If this adaptive speed control detects a preceding vehicle, the speed of the vehicle is controlled in terms of a constant distance control and the preceding vehicle is followed. If the radar sensor detects that there is no preceding vehicle, the speed control regulates the speed of the vehicle in terms of constant speed control to a speed input set by the driver. It is also described that the distance of the vehicle from the preceding vehicle is able to be set in the form of a time gap. In this context, the time gap represents the time period that the driver's own vehicle requires to cover the intermediate vehicle distance. This results in a speed-dependent distance based on the natural driving behavior of a human driver.

SUMMARY OF THE INVENTION

The core of the present invention is to change the driving behavior of the speed control as a function of the time gap setting. Drivers who prefer a sporty driving style select a shorter time gap compared to drivers who prefer driving comfortably and in a safety-conscious manner and select greater time gaps. Drivers who prefer driving in a sporty manner and accordingly select a shorter time gap also prefer more dynamic driving behavior for the speed control. According to the present invention, in particular, the adjustment of the longitudinal dynamics of the vehicle as a function of the selected time gap allows the driver to select a driving style in a simple and traceable manner that would correspond with the driver's own driving style without distance control.

Advantageously, a different driving program is selected by selecting and changing the time gap.

It is also advantageous that, given a decrease in the time gap, the maximum possible vehicle acceleration and/or vehicle deceleration implementable by the speed control system is increased. As a result, the vehicle is also capable of accelerating or decelerating more quickly given a small time gap distance than in the case of greater time gaps.

In addition, it is advantageous that given a decrease in the time gap, the deceleration devices of the vehicle are first activated at a shorter distance from the preceding vehicle. This advantage achieves a more dynamic driving style, provided that the driver selected a shorter time gap that corresponds with the sporty driver desire.

A realization of the method of the present invention in the form of a control element provided for a control unit of an adaptive distance or speed control of a motor vehicle is of particular importance. In this context, a program is stored on the control element, is executable on a computer, in particular on a microprocessor or signal processor, and is suitable for carrying out the method of the present invention. Therefore, in this case, the present invention is realized by a program stored on the control element so that this control element provided with the program represents the present invention in the same manner as the method which is suitably carried out by the program. In particular, an electric storage medium, e.g. a read only memory, may be used as the control element.

BRIEF DESCRIPTION OF THE DRAWING

The FIGURE shows a block diagram of an exemplary embodiment of the device of the present invention.

DETAILED DESCRIPTION

The FIGURE shows a speed control device 1, which has an input circuit 2 among other things. Input circuit 2 supplies input signals to speed control device 1. As a result, object data 4, which are provided by a send and receive device for radar beam 3, are supplied to input circuit 2. The send and receive device for radar beam 3 sends radar signals that are reflected by objects at the edge of the roadway and by preceding vehicles. The reflected and received radar partial waves are evaluated in send and receive device 3. At least the distance of detected objects, the relative speed of the detected objects, as well as the azimuth angle of the detected objects are supplied as object data 4 to input circuit 2 by send and receive device 3. Furthermore, operating signals 6, which are generated by an operating device 5, are supplied to input circuit 2. Operating device 5 includes operating and control devices that the driver of the motor vehicle operates to activate the adaptive speed control as well as to select its functional settings. Operating element 5 allows the driver among other things to define a time gap that corresponds with the distance at which the driver's own vehicle is to follow behind a preceding vehicle.

The signals received via input circuit 2 are supplied via a data exchange device 8 to a computing device 7. Computing device 7 uses the input data to ascertain output signals that are relayed via data exchange device 8 to output circuit 11. In addition, speed control device 1 has a storage device 9, which is able to communicate with the computing device via a data exchange system 10. Alternatively, it may also be provided for data exchange device 8 as well as data exchange device 10 to be configured as a single data exchange system to which all components are connected. Different driving programs that may be transmitted via data exchange device 10 to computing device 7 depending on the selection of the time gap via operating element 5 are advantageously stored in storage device 9. A change in the time gap via operating device 5 allows computing device 7, which determines control signals for acceleration and deceleration devices 12, 14 of the vehicle from the input signals, to accept a suitable driving program from memory 9. As a result, the selected driving program corresponds with a longitudinal dynamics characteristic that corresponds with the selected time gap. If the driver desires a sporty, dynamic driving behavior, he selects a short time gap via operating device 5, and a driving program that allows, for example, greater acceleration and deceleration values by the speed control than in the case of time gaps for a greater distance is accepted in computing device 7 from memory 9. It is also possible to configure the driving programs such that in the case of a short time gap corresponding to a sporty driving program, the deceleration devices of the vehicle are first activated at a shorter distance from the preceding vehicle than in the case of a comfortable and safety-conscious driving program corresponding to a greater time gap.

The control signals determined as a function of supplied object data 4 and the selected driving program are sent via data exchange device 8 to an output circuit 11, which sends an acceleration or a torque request 13 to a power-determining control element of an internal combustion engine 12. Power-determining control element 12 may be configured, for example, as an electrically actuated throttle valve or as a fuel metering device in the form of a fuel injector for an internal combustion engine. Output circuit 10 also sends a deceleration signal 15 to deceleration devices 14 of the vehicle for the case that the vehicle must decrease its own speed. Deceleration devices 14 of the vehicle are advantageously configured as electrically actuatable breaking systems. The described device allows the driver to change the driving dynamics of speed control 1 via an easily manipulatable operating element 5 so that driver's driving desire is satisfied. As a result, the driver has access to a transparent operating concept for adaptive speed and distance control that is easily adaptable to the driver's wishes. This results in an easy to operate system, thereby increasing the transparency of the controller as well as the acceptance by the driver.

What is claimed is:

1. A device for controlling a speed of a motor vehicle in terms of one of (a) a constant distance control in the case that at least one preceding vehicle is detected by a radar sensor and (b) a constant speed control in the case that no preceding vehicle is detected by a radar sensor, the device comprising:
   an arrangement for allowing a distance to a preceding vehicle to be set by a driver of the vehicle in the form of a time gap;
   an arrangement for changing longitudinal dynamics of the speed control when the time gap changes;
   an arrangement for increasing, given a decrease in the time gap, at least one of a maximum possible vehicle acceleration and a maximum possible vehicle deceleration implementable by a speed control system so that the vehicle is capable of at least one of accelerating and decelerating more quickly given the decrease in the time gap; and
   an arrangement for first activating, given the decrease in the time gap, deceleration devices of the vehicle at a shorter distance from the preceding vehicle.

2. The device according to claim 1, wherein a change in the time gap allows different driving programs to be selected.

3. A method for controlling a speed of a motor vehicle in terms of one of (a) a constant distance control in the case that at least one preceding vehicle is detected by a radar sensor and (b) a constant speed control in the case that no preceding vehicle is detected by a radar sensor, the method comprising:
   setting a distance to a preceding vehicle by a driver of the vehicle in the form of a time gap;
   changing longitudinal dynamics of the speed control when the time gap changes;
   increasing, given a decrease in the time gap, at least one of a maximum possible vehicle acceleration and a maximum possible vehicle deceleration implementable by a speed control system so that the vehicle is capable of at least one of accelerating and decelerating more quickly given the decrease in the time gap; and
   first activating, given the decrease in the time gap, deceleration devices of the vehicle at a shorter distance from the preceding vehicle.

* * * * *